(12) United States Patent
Xu et al.

(10) Patent No.: US 8,749,214 B2
(45) Date of Patent: Jun. 10, 2014

(54) POWER CIRCUIT AND CIRCUIT BOARD, ELECTRICAL DEVICE USING THE SAME

(75) Inventors: Bing-Bing Xu, Jiangsu (CN); Ju-Ya Luo, Jiangsu (CN); Zhao-Long Dong, Jiangsu (CN); Ching-Ji Liang, Taipei (TW)

(73) Assignee: Asus Technology Pte Ltd, Eightrium (SG)

( * ) Notice: Subject to any disclaimer, the term of this patent is extended or adjusted under 35 U.S.C. 154(b) by 352 days.

(21) Appl. No.: 13/324,220

(22) Filed: Dec. 13, 2011

(65) Prior Publication Data

US 2012/0146600 A1    Jun. 14, 2012

(30) Foreign Application Priority Data

Dec. 14, 2010 (CN) .......................... 2010 1 0605113

(51) Int. Cl.
*G05F 1/56* (2006.01)
(52) U.S. Cl.
USPC ......................................... 323/271; 323/283
(58) Field of Classification Search
USPC .................. 323/271, 282–285, 351
See application file for complete search history.

(56) References Cited

U.S. PATENT DOCUMENTS

| | | | | |
|---|---|---|---|---|
| 5,705,919 | A * | 1/1998 | Wilcox | 323/282 |
| 6,304,066 | B1 * | 10/2001 | Wilcox et al. | 323/282 |
| 7,002,325 | B2 * | 2/2006 | Harris et al. | 323/272 |
| 7,026,798 | B2 * | 4/2006 | Cheung et al. | 323/225 |
| 7,031,175 | B2 | 4/2006 | Dequina et al. | |
| 7,061,215 | B2 * | 6/2006 | Harris | 323/268 |
| 7,215,102 | B2 * | 5/2007 | Harris et al. | 323/268 |
| 7,646,185 | B2 * | 1/2010 | Kim | 323/283 |
| 7,777,462 | B2 * | 8/2010 | Kudo et al. | 323/272 |
| 7,859,233 | B1 * | 12/2010 | Silva et al. | 323/222 |
| 7,880,458 | B2 * | 2/2011 | Cannella et al. | 323/288 |
| 8,203,321 | B2 * | 6/2012 | Liang et al. | 323/282 |
| 8,274,268 | B2 * | 9/2012 | Yen | 323/282 |
| 8,310,219 | B2 * | 11/2012 | Kuroyabu et al. | 323/271 |
| 8,587,269 | B2 * | 11/2013 | Salato | 323/271 |
| 8,629,660 | B2 * | 1/2014 | Nalbant | 323/222 |
| 2003/0021073 | A1 | 1/2003 | Nagata | |

FOREIGN PATENT DOCUMENTS

| | | |
|---|---|---|
| CN | 101056047 A | 10/2007 |
| CN | 201282325 Y | 7/2009 |
| CN | 201294453 Y | 8/2009 |

* cited by examiner

*Primary Examiner* — Adolf Berhane
(74) *Attorney, Agent, or Firm* — Muncy, Geissler, Olds & Lowe, P.C.

(57) ABSTRACT

A power circuit includes a control unit, a logic control circuit, a first driver amplifier, a second driver amplifier and a logic determination circuit. The control unit is used to output a pulse width modulation (PWM) signal and an enable (EN) signal. The logic control circuit receives the PWM signal and the EN signal, and outputs a first voltage signal and a second voltage signal. The first driver amplifier receives the first voltage signal, and outputs a first gate (UGATE) drive signal. The second driver amplifier receives the second voltage signal, and outputs a second gate (LGATE) drive signal. The logic determination circuit receives the PWM signal and the first and second gate drive signals. When the PWM signal and the first and second gate drive signals meet an abnormal logical relation, the logic determination circuit disables the logic control circuit.

14 Claims, 4 Drawing Sheets

POWER CIRCUIT AND CIRCUIT BOARD, ELECTRICAL DEVICE USING THE SAME

CROSS REFERENCE TO RELATED APPLICATIONS

This Non-provisional application claims priority under 35 U.S.C. §119(a) on Patent Application No(s). 201010605113.6 filed in People's Republic of China on Dec. 14, 2010, the entire contents of which are hereby incorporated by reference.

BACKGROUND OF THE INVENTION

1. Field of Invention

The invention relates to a power circuit supplying power to an electronic device and, more particularly, to a power circuit with a self-protection function.

2. Related Art

A switch power circuit has characters of low loss, high switching frequency and stable operation. Thus, it is widely used in a liquid crystal display (LCD) television, a computer system, a handheld device and other electronic devices.

FIG. 1 is a schematic diagram showing architecture of a conventional power circuit.

The power circuit 10 receives input signals and outputs signals. The power circuit 10 includes a logic control circuit 2 and a driver circuit 3.

After the logic control circuit 2 receives the input signals, it converts the input signals to multiple output signals and sends them to the driver circuit 3, respectively. The input signals include an enable (EN) signal and a pulse width modulation (PWM) signal. The EN signal controls operation of the power circuit, and the PWM signal provides motion commands to the power circuit.

When the driver circuit 3 receives the multiple output signals, it outputs a drive signal to a switch circuit (not shown). The driver circuit 3 includes a first driver amplifier 31 and a second driver amplifier 32. The first driver amplifier 31 and the second driver amplifier 32 receive different output signals and output a first gate (UGATE) drive signal and a second gate (LGATE) drive signal, respectively.

The switch circuit connected to the power circuit 10 usually includes a first metal-oxide-semiconductor field-effect transistor (MOSFET) and a second MOSFET for receiving the first gate (UGATE) drive signal and the second gate (LGATE) drive signal LGATE, respectively.

The power circuit 10 and the switch circuit may be called the switch power circuit. When the switch power circuit is used in client, the components inside are easy to be burned out due to bad environment or operation errors. If the switch power circuit does not have a self-protection function, when a certain component, such as the first driver amplifier 31, the second driver amplifier 32, the first MOSFET or the second MOSFET, is burned out, other relating components may be also burned out due to a chain reaction. For example, when the first MOSFET is burned out, the connected first driver amplifier 31 is also burned out, or when the first driver amplifier 31 is abnormal, the first MOSFET may also be burned out.

SUMMARY OF THE INVENTION

A power circuit with a self-protection function can determine whether the power circuit is in an abnormal state or not by detecting signals. If the power circuit is in an abnormal state, relating components of the power circuit are disabled to be protected.

A power circuit includes a control unit, a logic control circuit, a first driver amplifier, a second driver amplifier and a logic determination circuit. The control unit outputs a PWM signal and an EN signal. The logic control circuit receives the PWM signal and the EN signal and outputs a first voltage signal and a second voltage signal. The first driver amplifier is electrically connected to the logic control circuit, receives the first voltage signal, and outputs a first gate (UGATE) drive signal. The second driver amplifier is electrically connected to the logic control circuit, receives the second voltage signal, and outputs a second gate (LGATE) drive signal. The logic determination circuit receives the PWM signal, the UGATE drive signal and the LGATE drive signal, and when the PWM signal, the UGATE drive signal and the LGATE signal meet an abnormal logical relation, the logic determination circuit disables the logic control circuit.

A circuit board includes a switch circuit and a power circuit. The power circuit is connected to the switch circuit. The power circuit includes a control unit, a logic control circuit, a first driver amplifier, a second driver amplifier and a logic determination circuit. The control unit outputs a PWM signal and an EN signal. The logic control circuit receives the PWM signal and the EN signal and outputs a first voltage signal and a second voltage signal. The first driver amplifier is electrically connected to the logic control circuit, receives the first voltage signal, and outputs a UGATE drive signal. The second driver amplifier is electrically connected to the logic control circuit, receives the second voltage signal, and outputs a LGATE drive signal. The logic determination circuit receives the PWM signal, the UGATE drive signal and the LGATE drive signal, and when the PWM signal, the UGATE drive signal and the LGATE drive signal meet an abnormal logical relation, the logic determination circuit disables the logic control circuit.

An electronic device includes a load, a switch circuit and a power circuit. The switch circuit is connected to the load and the power circuit. The power circuit includes a control unit, a logic control circuit, a first driver amplifier, a second driver amplifier and a logic determination circuit. The control unit outputs a PWM signal and an EN signal. The logic control circuit receives the PWM signal and the EN signal and outputs a first voltage signal and a second voltage signal. The first driver amplifier is electrically connected to the logic control circuit, receives the first voltage signal, and outputs a UGATE drive signal. The second driver amplifier is electrically connected to the logic control circuit, receives the second voltage signal, and outputs a LGATE drive signal. The logic determination circuit receives the PWM signal, the UGATE drive signal and the LGATE drive signal, and when the PWM signal, the UGATE drive signal and the LGATE drive signal meet an abnormal logical relation, the logic determination circuit disables the logic control circuit.

It can be determined that whether the power circuit breaks down by detecting a logical relation among the multiple signals of the power circuit, and the power circuit is further disabled to avoid more serious damage to other components accordingly. Additionally, by setting a clock signal generator, the logical relation among the multiple signals is detected in a certain time interval according to practical requirements.

These and other features, aspects and advantages of the present invention will become better understood with regard to the following description, appended claims, and accompanying drawings.

DETAILED DESCRIPTION OF THE INVENTION

Figure 1:
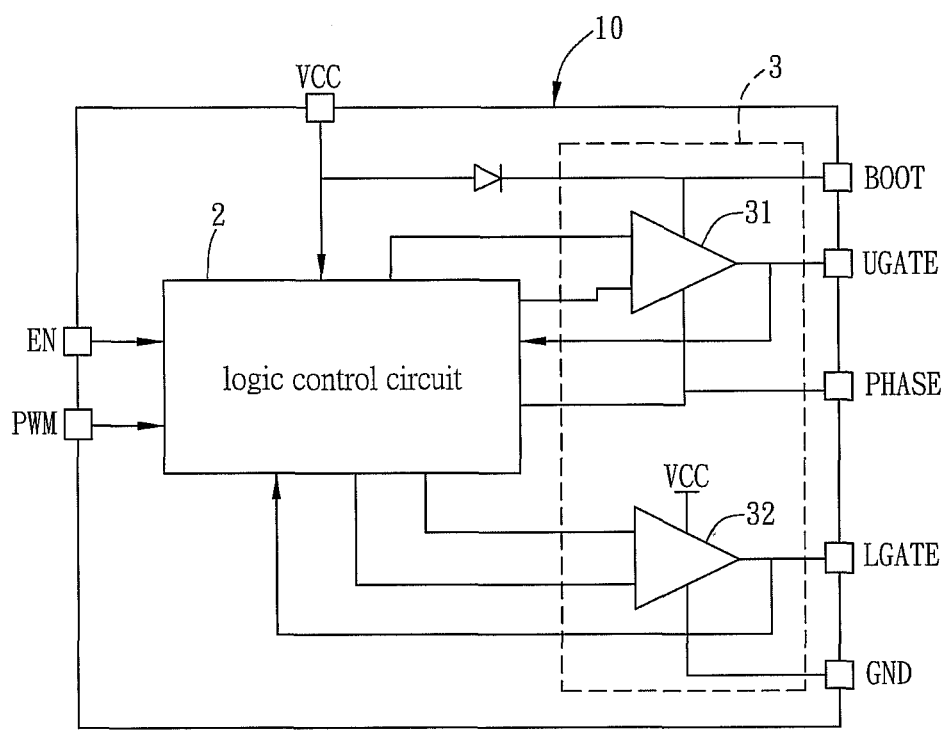
FIG. 1 is a schematic diagram showing architecture of a conventional power circuit.
Figure 2:
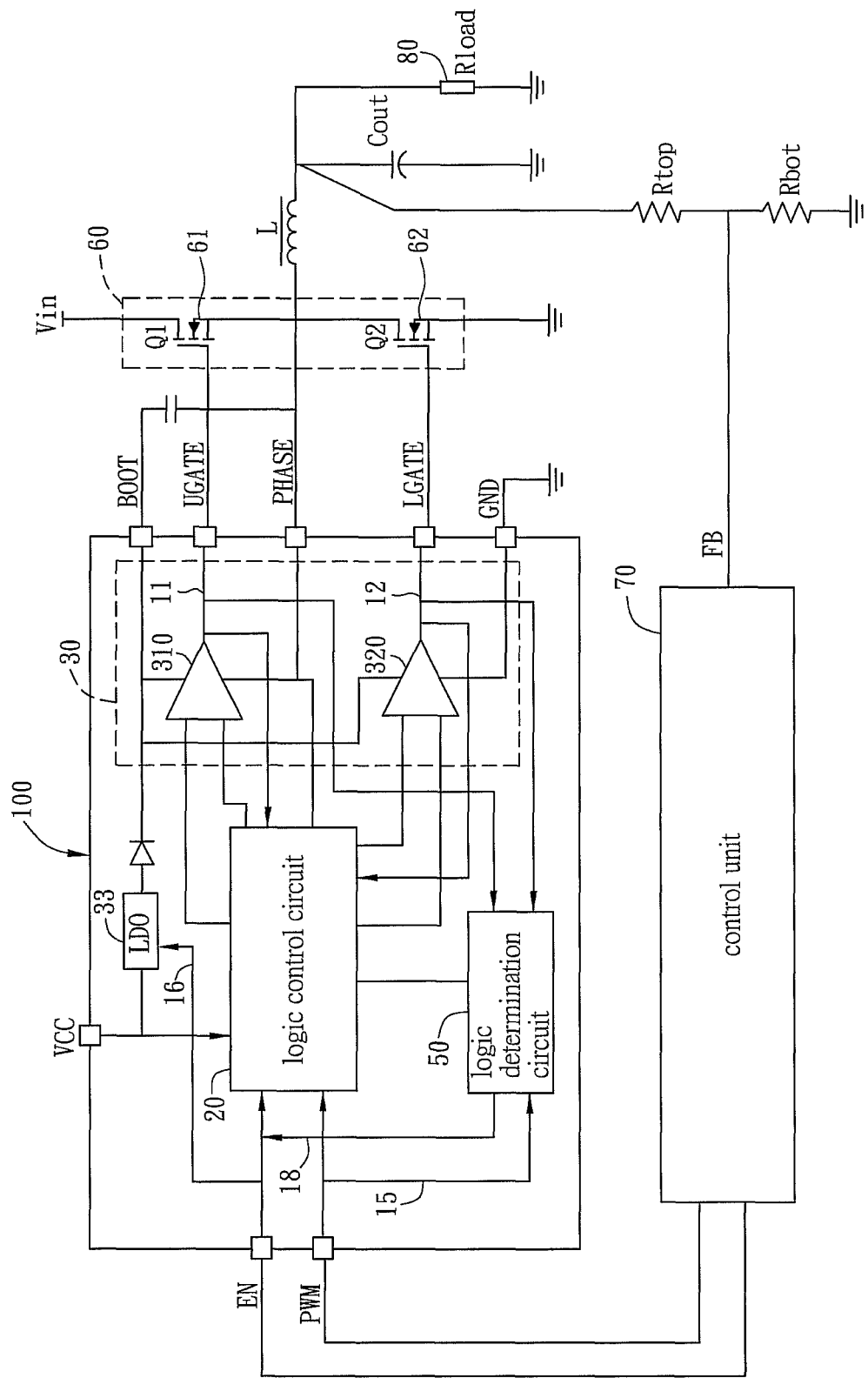
FIG. 2 is a schematic diagram showing architecture of a power circuit in an embodiment.

FIG. 2 is a schematic diagram showing architecture of a power circuit in an embodiment. The power circuit 100 includes a control unit 70, a logic control circuit 20, a driver circuit 30 and a logic determination circuit 50.

The control unit 70 outputs a PWM signal and an EN signal.

The logic control circuit 20 receives the PWM signal and the EN signal and outputs a first voltage signal and a second voltage signal.

The driver circuit 30 includes a first driver amplifier 310 and a second driver amplifier 320. The first driver amplifier 310 and the second driver amplifier 320 receive the first voltage signal and the second voltage signal, respectively, and output a first gate (UGATE) drive signal and a second gate (LGATE) drive signal.

The power circuit 100 is usually connected to the switch circuit 60, and the switch circuit 60 includes a first MOSFET 61 and a second MOSFET 62. The first MOSFET 61 and the second MOSFET 62 receives the UGATE drive signal and the LGATE drive signal, respectively.

The first MOSFET 61 and the second MOSFET 62 are connected to the load 80, respectively, to provide switch power to the load 80. The load 80 may be a common electrical element, such as a central processing unit (CPU), a memory or an external connecting card, of the electronic device.

The logic determination circuit 50 receives the PWM signal, the UGATE drive signal and the LGATE drive signal via line 11, 12 and 15.

When the logical relation among the PWM signal, the UGATE drive signal and the LGATE drive signal is abnormal, the logic determination circuit 50 disables the logic control circuit 20 and further disables the power circuit 100.

Figure 3:
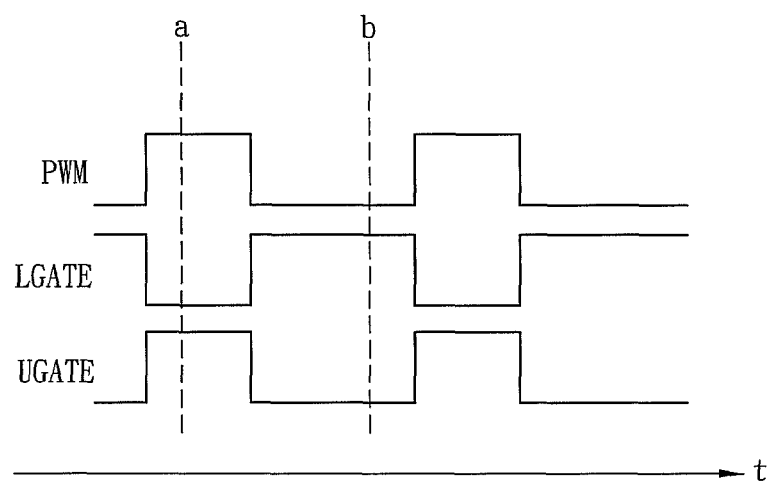
FIG. 3 is an oscillogram comparing waveform of a PWM signal, a first gate drive signal UGATE and a second gate drive signal LGATE in a normal operation in an embodiment.

In FIG. 3, when the power circuit 100 operates normally, comparison of waveforms of the PWM signal, the UGATE drive signal and the LGATE drive signal is shown.

As shown in FIG. 3, in an embodiment, the logical relation among the three signals in normal operation should meet the logical relation shown in dotted line at time a or at time b, that is, "0, 0, 1" or "1, 1, 0". "0" stands for low level, and "1" stands for high level, which is an example for illustration. "0" may also stand for high level, and "1" stands for low level in the field, and then the results are different.

Table 1 lists all of the logical relations among the three signals, instant states and final results accordingly.

TABLE 1

| state | PWM | UGATE | LGATE | Instant state | Indirect burned out | Final result |
|---|---|---|---|---|---|---|
| 1 | 0 | 0 | 1 | normal | normal | normal |
| 2 | 1 | 1 | 0 | normal | normal | normal |
| 3 | 0 | 1 | 1 | the first driver amplifier is burned out | the first MOSFET is broken down | the power circuit and the |
| 4 | 1 | 1 | 1 | the second driver amplifier is burned out | the second MOSFET is broken down | MOSFET are burned out, and the load may be burned out |
| 5 | 0 | 1 | 0 | the first driver amplifier and the second driver amplifier are burned out | the load is burned out | |
| 6 | 0 | 0 | 0 | the second driver amplifier is burned out the first MOSFET is burned out or the first MOSFET and the second MOSFET are burned out | the power circuit is burned out the first driver amplifier is burned out or the first driver amplifier and the second driver amplifier are burned out | |
| 7 | 1 | 0 | 1 | the first driver amplifier and the second driver amplifier are burned out | the power circuit is burned out | |
| 8 | 1 | 0 | 0 | the first driver amplifier is burned out the second MOSFET is burned out or the first MOSFET and the second MOSFET are burned out | the power circuit is burned out the second driver amplifier is burned out or the first driver amplifier and the second driver amplifier are burned out | |

State 1 and state 2 in table 1 present the normal logical relation among the three signals when the power circuit 100 is in normal operation. That is, the potential of the UGATE drive signal and that of the PWM signal is the same, and the potential of the LGATE drive signal is opposite to that of the PWM signal.

In state 3 to state 8 in table 1, when the logical relation among the three signals is abnormal, it means that one or more of the components in the power circuit 100 have faults, and it may be caused by the damage of one of the first driver amplifier 310, the second driver amplifier 320, the first MOSFET 61 and the second MOSFET 62. When the fault happens, if the power circuit 100 does not have a self-protection function, other components, even most of the components in the power circuit 100, may be further damaged due to a chain reaction.

When the logic determination circuit 50 receives the PWM signal, the UGATE drive signal and the LGATE drive signal, and the three signals have an abnormal logical relation as in state 3 to state 8, it means that the power circuit is at an abnormal state, and then the logic control circuit 20 is disabled to disable the power circuit 100 and avoid more serious damage.

The power circuit 100 in the embodiment is a direct current to direct current (DC-DC) buck power circuit, and the power circuit 100 also may be a DC-DC boost power circuit. Persons having ordinary skill in the art may take practice to confirm the abnormal logical relations based on the illustration in the embodiment and achieve the same technical effect.

Figure 4:
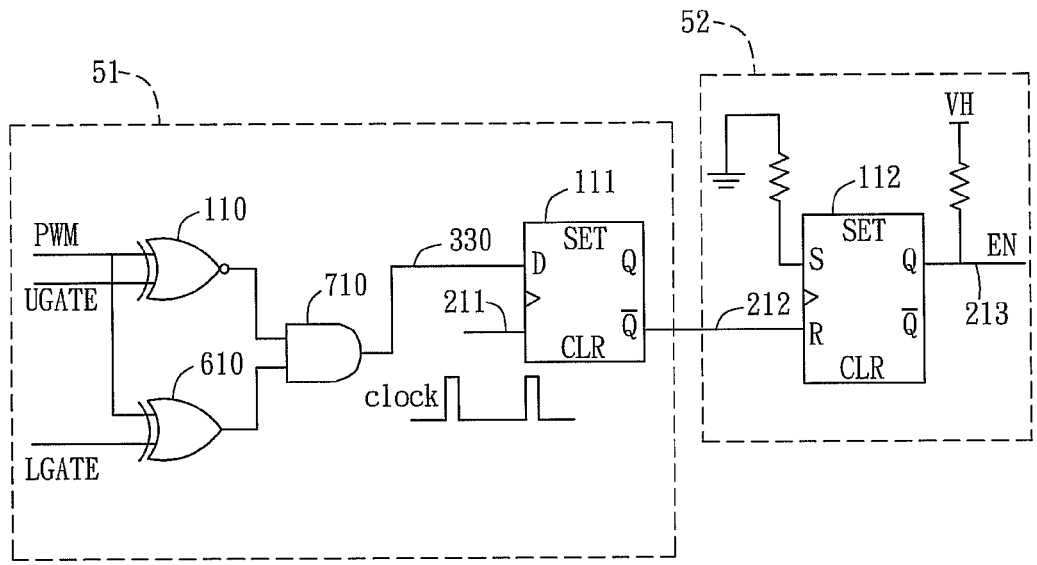
FIG. 4 is a schematic diagram showing architecture of a logic determination circuit in an embodiment.

FIG. 4 is a schematic diagram showing architecture of a logic determination circuit in an embodiment.

FIG. 4 illustrates that the logic determination circuit 50 receives signals and outputs signals to disable the power circuit 100 in one embodiment, which is not limited herein. Persons having ordinary skill in the art may replace, reduce or add components in the architecture to achieve the function of the logic determination circuit 50 based on the specification.

The logic determination circuit 50 includes a detecting module 51 and an output module 52.

The detecting module 51 includes at least an XNOR logical gate 110, an XOR logical gate 610 and an AND logical gate 710. The XNOR logical gate 110 and the XOR logical gate 610 are connected to the AND logical gate 710. The XNOR logical gate 110 receives the PWM signal and the UGATE drive signal. If the PWM signal and the UGATE drive signal have the same potential, the XNOR logical gate 110 outputs a high level signal, and if the PWM signal and the UGATE drive signal have opposite potential, the XNOR logical gate 110 outputs a low level signal. The XOR logical gate 610 receives the PWM signal and the LGATE drive signal. If the PWM signal and the LGATE drive signal have opposite potential, the XOR logical gate 610 outputs a high level signal, and if the PWM signal and the LGATE drive signal have the same potential, the XOR logical gate 610 outputs a low level signal. If the signals outputted by the XNOR logical gate 110 and the XOR logical gate 610 are the same, the AND logical gate 710 outputs a high level signal. If the signals outputted by the XNOR logical gate 110 and the XOR logical gate 610 are different, the AND logical gate 710 outputs a low level signal. The AND logical gate 710 generates an output signal 330.

In the architecture, the eight states in table 1 all have a corresponding output signal 330. In state 1 and state 2, the output signal 330 is a high level signal. In state 3 to state 8, the output signal 330 is a low level signal. The output module 52 determines whether to disable the power circuit 100 according to the output signal 330.

Persons having ordinary skills in the art may use different logical gates to do logical operation according the logical relation stated above, and an output signal 330 in a normal state and an output signal 330 in an abnormal state are different.

The detecting module 51 may further include a delay trigger 111. The delay trigger 111 is connected to the output signal 330 and a clock signal generator (not shown). The delay trigger 111 receives a CLK signal 211, and only when the CLK signal 211 is at high level, the delay trigger 111 outputs a signal 212 to the output module 52.

Figure 5:
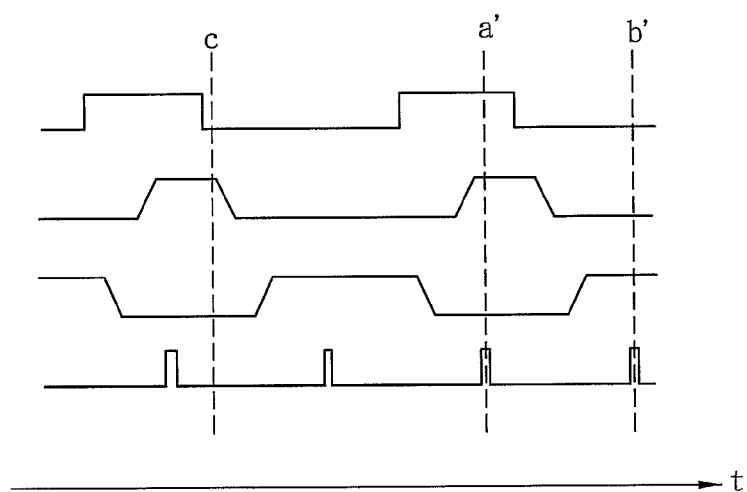
FIG. 5 is an oscillogram showing a relation between a clock (CLK) signal and other three signals in an embodiment.

FIG. 5 is an oscillogram showing relation between the CLK signal 211 and other three signals in an embodiment.

In practice, the PWM signal, the UGATE drive signal and the LGATE drive signal of the power circuit 100 may slow rise and slow drop. For example, the detecting result at time c in FIG. 5 may lead to mistakes in operation. Technicians can set the CLK signal, and when the CLK signal is at high level, such as at time a' or time b', the logic determination circuit 50 determines whether the PWM signal, the UGATE drive signal and the LGATE drive signal meet the abnormal logical relation. Consequently, the power circuit can effectively avoid mistakes in determination and operation via the setting.

Please refer to FIG. 4. The output module 52 includes an RS trigger 112 for receiving the signal 212 and providing a locking function. Additionally, the delay trigger 111 may set the signal 212 and the output signal 330 at opposite phases. That is, when the output signal 330 is at high level, the signal 212 outputted by the delay trigger 111 is at low level.

Please refer to FIG. 2. The logic determination circuit 50 uses a line 18 to pull down the potential of the EN signal to disable the logic control circuit 20. When the signal 212 is at low level, the RS trigger 112 outputs a low level signal 213 to pull down the potential of the EN signal, the logic control circuit 20 stops operating and the power circuit 100 is disabled. When the output signal 330 is reverse to make the signal 212 back to high level, the RS trigger 112 keeps the outputted signal 213 at a low level. Thus, the power circuit 100 cannot be restored after it is disabled, and even though the abnormal state disappears, the circuit does not operate again. As a result, the setting can prevent that an unstable abnormal signal (or an unpredictable abnormal signal) makes the protection function ineffective. Usually, the abnormal state brings great risk when it happens for once, and thus it should not happen repeatedly.

The logic determination circuit 50 can determine whether to disable the logic control circuit 20 according to the logical relation among the three signals, so as to disable the power circuit 100 in an abnormal state.

In one embodiment, the RS trigger 112 is used to pull down the potential of the EN signal to disable the logic control circuit 20. A triode also may be used to be connected to the EN signal, the logic control circuit 20, and the gate of the triode is connected to the signal 212. When the signal 212 is at high level, the logic control circuit 20 receives the EN signal. When the signal 212 is at low level, the logic control circuit 20 cannot receive the EN signal, which means that the logic control circuit 20 is disabled.

The power circuit 100 also may include a low dropout regulator (LDO) circuit 33. The LDO circuit 33 is connected to the signal 213 (as shown in FIG. 4) via a line 16 (as shown in FIG. 2) and outputs a signal to the first driver amplifier 310 and the second driver amplifier 320. When the signal 213 is at low level, the LDO circuit 33 controls the first driver amplifier 310 and the second driver amplifier 320 to stop operating, so as to avoid damage to the first driver amplifier 310 and the second driver amplifier 320. The LDO circuit 33 also may be replaced by other circuits as long as it can disable the first driver amplifier 310 and the second driver amplifier 320 according to signals.

In the embodiments stated above, a logical relation among multiple signals in the power circuit is detected to determine whether the circuit has a fault, and then the power circuit may be disabled to avoid more serious faults and damage to other components accordingly. A clock signal generator may also be used to detect the logical relation among multiple signals in a certain time interval according to practical requirements. An LDO circuit also may be used to disable the first driver amplifier and the second driver amplifier to avoid further damage in an abnormal state.

Although the present invention has been described in considerable detail with reference to certain preferred embodiments thereof, the disclosure is not for limiting the scope.

Persons having ordinary skill in the art may make various modifications and changes without departing from the scope. Therefore, the scope of the appended claims should not be limited to the description of the preferred embodiments described above.

What is claimed is:

1. A power circuit, comprising:
   a control unit outputting a pulse width modulation (PWM) signal and an enable (EN) signal;
   a logic control circuit receiving the PWM signal and the EN signal and outputting a first voltage signal and a second voltage signal;
   a first driver amplifier electrically connected to the logic control circuit, for receiving the first voltage signal and outputting a first gate drive signal;
   a second driver amplifier electrically connected to the logic control circuit, receiving the second voltage signal and outputting a second gate drive signal; and
   a logic determination circuit receiving the PWM signal, the first gate drive signal and the second gate drive signal, wherein when the PWM signal, the first gate drive signal and the second gate drive signal meet an abnormal logical relation, the logic determination circuit disables the logic control circuit.

2. The power circuit according to claim 1, wherein when the PWM signal, the first gate drive signal and the second gate drive signal meet the abnormal logical relation, the logic determination circuit pulls down potential of the EN signal to disable the first driver amplifier and the second driver amplifier.

3. The power circuit according to claim 1, wherein the logic determination circuit is electrically connected to the first driver amplifier and the second driver amplifier, respectively, and when the PWM signal, the first gate drive signal and the second gate drive signal meet the abnormal logical relation, the logic determination circuit disables the first driver amplifier and the second driver amplifier.

4. The power circuit according to claim 1, wherein the power circuit is a direct current to direct current (DC-DC) buck power circuit.

5. The power circuit according to claim 1, wherein the power circuit is a DC-DC boost power circuit.

6. The power circuit according to claim 1, wherein the power circuit further comprises:
   a clock signal generator electrically connected to the logic determination circuit and controlling a time of the logic determination circuit determining whether the PWM signal, the first gate drive signal and the second gate drive signal meet the abnormal logical relation.

7. A circuit board, comprising:
   a switch circuit, and
   a power circuit electrically connected to the switch circuit, comprising:
      a control unit outputting a PWM signal and an EN signal;
      a logic control circuit receiving the PWM signal and the EN signal, and outputting a first voltage signal and a second voltage signal;
      a first driver amplifier electrically connected to the logic control circuit, for receiving the first voltage signal and outputting a first gate drive signal;
      a second driver amplifier electrically connected to the logic control circuit, receiving the second voltage signal and outputting a second gate drive signal; and
      a logic determination circuit receiving the PWM signal, the first gate drive signal and the second gate drive signal, wherein when the PWM signal, the first gate drive signal and the second gate drive signal meet an abnormal logical relation, the logic determination circuit disables the logic control circuit.

8. The circuit board according to claim 7, wherein when the PWM signal, the first gate drive signal and the second gate drive signal meet the abnormal logical relation, the logic determination circuit pulls down potential of the EN signal to disable the first driver amplifier and the second driver amplifier.

9. The circuit board according to claim 7, wherein the logic determination circuit is electrically connected to the first driver amplifier and the second driver amplifier, respectively, and when the PWM signal, the first gate drive signal and the second gate drive signal meet the abnormal logical relation, the logic determination circuit disables the first driver amplifier and the second driver amplifier.

10. The circuit board according to claim 7, wherein the circuit board further comprises:
    a clock signal generator electrically connected to the logic determination circuit and controlling a time of the logic determination circuit determining whether the PWM signal, the first gate drive signal and the second gate drive signal meet the abnormal logical relation.

11. An electronic device, comprising:
    a load;
    a switch circuit electrically connected to the load; and
    a power circuit electrically connected to the switch circuit, comprising:
       a control unit outputting a PWM signal and an EN signal;
       a logic control circuit receiving the PWM signal and the EN signal, and outputting a first voltage signal and a second voltage signal;
       a first driver amplifier electrically connected to the logic control circuit, receiving the first voltage signal and outputting a first gate drive signal;
       a second driver amplifier electrically connected to the logic control circuit, receiving the second voltage signal and outputting a second gate drive signal; and
       a logic determination circuit receiving the PWM signal, the first gate drive signal and the second gate drive signal, wherein when the PWM signal, the first gate drive signal and the second gate drive signal meet an abnormal logical relation, the logic determination circuit disables the logic control circuit.

12. The electronic device according claim 11, wherein when the PWM signal, the first gate drive signal and the second gate drive signal meet the abnormal logical relation, the logic determination circuit pulls down potential of the EN signal to disable the first driver amplifier and the second driver amplifier.

13. The electronic device according claim 11, wherein the logic determination circuit is electrically connected to the first driver amplifier and the second driver amplifier, respectively, and when the PWM signal, the first gate drive signal and the second gate drive signal meet the abnormal logical relation, the logic determination circuit disables the first driver amplifier and the second driver amplifier.

14. The electronic device according claim 11, wherein the electronic device further comprises:
    a clock signal generator electrically connected to the logic determination circuit and controlling a time of the logic determination circuit determining whether the PWM signal, the first gate drive signal and the second gate drive signal meet the abnormal logical relation.

* * * * *